Aug. 31, 1954
C. F. WILLIAMS
2,687,818
GRAIN HOPPER FOR USE ON ELEVATING CONVEYERS
Filed June 16, 1952
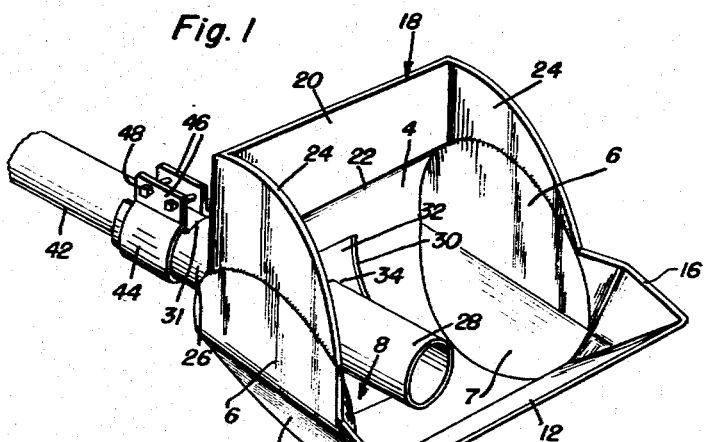
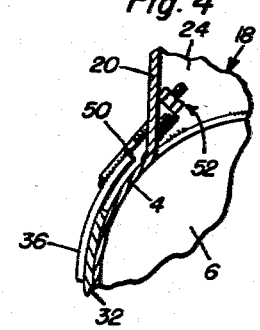
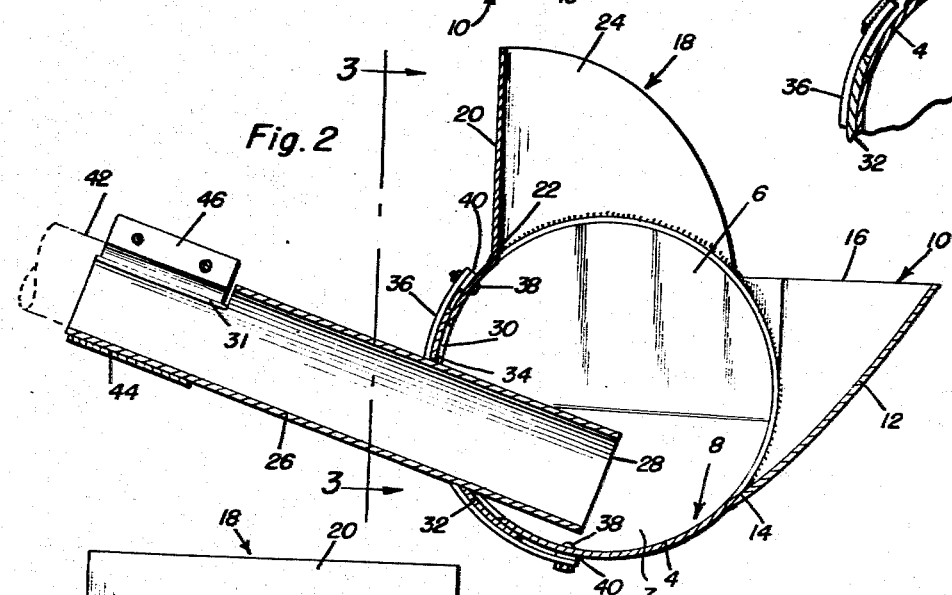
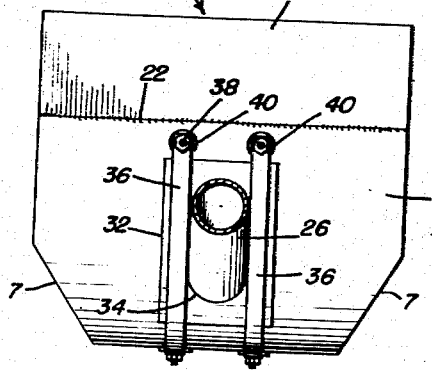
Carl F. Williams
INVENTOR.
BY
*Clarence A. O'Brien
and Harvey B. Jacobson*
Attorneys Patented Aug. 31, 1954

2,687,818

UNITED STATES PATENT OFFICE 2,687,818

GRAIN HOPPER FOR USE ON ELEVATING CONVEYERS

Carl F. Williams, Dodge City, Kans.

Application June 16, 1952, Serial No. 293,713

4 Claims. (Cl. 214—17)

The present invention relates to a structurally and functionally novel portable grain hopper expressly adapted to be used in conjunction with grain elevators, for example, those which are characterized by an elongate tubular conduit provided with an internal screw conveyor or equivalent lift means.

It is a matter of common knowledge that the discharge ends of certain truck beds, when the latter are in dumping position, are much nearer to the ground level than others, some being as low as 10 or 12 inches in respect to the ground. Needless to say, the lower intake end of the conveyor means has to be low enough to be amply covered with grain at all times, or otherwise it does not function efficiently. For this reason many of the hoppers which are now manufactured for use have the lower end of the conveyor below the level of the ground in order to be low enough to accommodate those trucks whose beds come quite close to the ground when in the aforementioned dumping position. It is an object of the present invention, taking the above into account, to provide a more practical hopper which is such in construction and arrangement that the intake mouth and lip portions thereof may be readily lowered or raised, depending upon requirements, in order that the stated lip of the hopper may be positioned at various heights ranging anywhere from eight to twenty-four inches in respect to the ground.

It is also generally well known that marketed type hoppers often have the intake end of the conveyor situated below the level of the hopper and this necessitates digging a hole to accommodate said end. It is an object of the present invention to overcome this objection and to provide a hopper construction which may be satisfactorily used on the cement floor of a granary.

Many hoppers now being manufactured and used are exceedingly heavy, unwieldly and are difficult to handle and operate. It is therefore another object of the present invention to provide an improved hopper which is comparatively small, compact, light in weight and which is capable of being readily handled by one man.

In carrying out a preferred embodiment of the invention the hopper utilized is characterized by a receiver having a substantially semi-circular body or wall portion provided with end walls and providing a wide open grain intake space, there being a visor-like extension forming a scoop or lip and providing a highly satisfactory chute for delivering the grain from the discharge end of a dump truck into said receiver.

In addition there is an anti-spilling guard and this is mounted on top and rises above the open top portion of the receiver space of the hopper.

Considered from another point of view the hopper is properly constructed for ready and practical attachment to the intake end of the usual grain elevating conveyor conduit and embodies a grain intake and conveyor tube having its intake end operatively located within the confines of the receiver space and having its discharge end extending exteriorly of the main hopper wall to accommodate and permit the intake end of the conveyor to be attached thereto.

Then, too, novelty is predicated upon the stated tube, this being adjustably connected intermediate its ends with said main wall, whereby the hopper and tube may be adjusted and regulated in respect to each other to maintain the intake end of the tube effectively submerged in the accumulated grain at all times.

More specifically, the main wall is provided with a vertically disposed slot and the intermediate portion of the pickup tube is secured at a suitable angle to an adapter plate. The adapter plate closes the slot and is adjustably mounted in assembling and retaining straps secured to the exterior of said wall.

Other objects, features and advantages will become more readily apparent from the following description and accompanying sheet of drawings.

In the accompanying sheet of drawings wherein like numerals are employed to designate like parts throughout the views:

Figure 1 is a perspective view of a hopper constructed in accordance with the invention and showing the manner in which it is connected with the intake end of the elevating or conveyor conduit.

Figure 2 is an enlarged central transverse sectional view showing the details of construction with greater particularity.

Figure 3 is a section taken approximately on the vertical line 3—3 of Figure 2, looking in the direction of the arrows.

Figure 4 is a fragmentary view showing a phase of the over-all construction in which a variation in the construction of one of the features is resorted to.

As before mentioned the improved hopper is essentially cylindrical in cross-sectional form. The main body portion, the concavo-convex wall 4, is approximately semi-circular in form and the integration therewith of alined end heads 6—6 provides the desired grain trapping and accumulating space or receiver 8. It will be noticed that the lower half portions 7 of the heads are inclined and thus diverge toward each other. The front or intake side of the hopper is open for unrestricted reception of grain from the discharge end of a dump-truck or the like (not shown). The visor-like extension which communicates with the open front is denoted by the numeral 10 and it comprises a wall 12 which is welded or otherwise joined to the walls 4 and 6—6 as at 14, said wall 12 being at an approximate tangent to the hopper. The triangulated end walls are denoted at 16 and this combination of walls 12 and 16 forms an intake lip or scoop as it is commonly referred to in general practice. To minimize brimming over and excess spilling of the grain, an overflow baffle or guard 18 is provided. In general appearance this may be said to be of U-shaped form in plan and it is attached to and lies in a plane above the open top portion of the hopper. The central or bight portion 20 is welded at 22 to the upper edge of the semi-circular wall 4. The lateral ends or wings 24 are welded to and are coplanar with the circular end walls 6.

The aforementioned grain inlet and conveyor tube is rigid and is denoted by the numeral 26. The intake end thereof, as at 28, extends into the receiver 8. The rear portion of the wall 4 is provided with a centrally positioned vertical slot 30 permitting the end 28 to project into the receiver space 8 and allowing the opposite notched end 31 to project exteriorly of the wall 4. There is a substantially rectangular and suitably curved adapter plate 32 provided and this serves as a mount for the tube 26. It also serves as a closure or cover for the slot 30. The intermediate portion of the tube is passed through the plate 32 and is welded thereto as at 34. Suitably bowed metal straps or guides 36—36 are provided and these are bolted in spaced parallel relation, as at 38, to the wall 4 on opposite sides of the slot. The numerals 40 designate spacing washers. These straps function as attaching members as well as tracks and adjustably connect the adapter plate 32 with the slotted portion of the wall 4. This permits the tube 26 to be angularly adjusted in respect to the hopper or vice versa. The notched discharge end 31 of the tube 26 is communicatively connected with the conduit 42 of the conveyor. A suitable clamp 44 is provided and this has flanges 46—46 which are bolted together as at 48.

In practice the unloading end of the conveyor is raised to the required height and the adapter plate 32 on the tube 26 is then fastened to the hopper by bolts. A movement of about four inches of the adapter plate on the hopper will permit the unloading end of the conveyor to be raised from its lowest to its maximum height. The adapter plate is not only for the purpose of fastening the tube 26 to the hopper but is also for the purpose of preventing grain from escaping and falling upon the ground.

It will be obvious that the construction herein shown makes it possible to aptly adjust the hopper relative to the conveyor conduit for best results, that the intake end 28 of the tube 26 may likewise be angled to submerge itself into the grain which is trapped in the space of the receiver 8 and that the scoop or lip means 10 may be located at any desired position from five to twenty inches above the ground for effective reception of the grain from a dump-truck or similar conveyance.

There may be situations in connection with this matter where the upper bolts 38 in Figure 2 would be dispensed with and the adjustable means of Figure 4 would be substituted. To this end the bowed straps 36—36 would be provided with integral screw-threaded studs 50, the latter being adjustably anchored in place as at 52. This arrangement permits slack in the straps to be taken up from time to time and insures better operating conditions and results.

Changes in shape, size, material and rearrangement of parts falling within the scope of the subjoined claims may be resorted to in actual practice.

Having described the invention, what is claimed as new is:

1. A grain hopper comprising a receiver which is essentially semi-cylindrical in cross-section and embodies a main body wall having a centrally disposed vertical slot therein and complemental converging end walls, a scoop-like extension attached to the forward lower edge portion of said main wall, a pair of guide and assembling tracks fixedly mounted on the exterior side of said main wall and on opposite sides of the slot, and an adapter plate slidably mounted in said guide tracks and adjustable relative to said main wall and covering the slot, and a tube fixed on said adapter plate and having one end projecting into the hopper and the other end projecting exteriorly and beyond said adapter plate.

2. The structure specified in claim 1 and an overflow guard mounted atop said hopper.

3. The structure defined in claim 1, wherein said tracks are in the form of straps which are provided with slack take-up and tensioning devices adjustably secured to complemental portions of said main wall.

4. A grain hopper comprising a receiver embodying a concavo-convex main wall and adjoining converging end walls defining a dished receiver, a scoop-like extension attached to the forward lower edge portion of said main wall and projecting outwardly and beyond the end wall, said main wall being provided at a point centrally between the end walls with a vertical slot and being provided on its exterior with guides located on opposite sides of said slot, an arcuate adapter plate covering said slot and slidably mounted in said guides, a conveyor tube passing through a central opening in said adapter plate and fixed to said adapter plate intermediate its ends and having its intake end located within the confines of said receiver and having its opposite end projecting exteriorly beyond said adapter plate, and guard means joined with the upper edge portion of said main wall and with cooperating portions of said end walls and cooperating therewith and with said receiver to diminish the likelihood of the grain spilling from said receiver by overflowing the stated upper edge of said main wall.

References Cited in the file of this patent

UNITED STATES PATENTS

| Number | Name | Date |
|---|---|---|
| 492,751 | Ross | Feb. 28, 1893 |
| 530,267 | Hendricks et al. | Dec. 4, 1894 |
| 2,155,910 | Severy | Apr. 25, 1939 |
| 2,212,358 | Weekley | Aug. 20, 1940 |
| 2,276,903 | Welty | Mar. 17, 1942 |